US010849267B2

(12) United States Patent
Strandberg et al.

(10) Patent No.: US 10,849,267 B2
(45) Date of Patent: Dec. 1, 2020

(54) REMOTE INTERACTION WITH A ROBOTIC VEHICLE

(71) Applicant: HUSQVARNA AB, Huskvarna (SE)

(72) Inventors: Stefan Strandberg, Jönköping (SE);
Maria Kihlbaum, Eksjö (SE); Philip Axell, Jönköping (SE); Andreas Källming, Tranås (SE)

(73) Assignee: HUSQVARNA AB, Huskvarna (SE)

( * ) Notice: Subject to any disclaimer, the term of this patent is extended or adjusted under 35 U.S.C. 154(b) by 176 days.

(21) Appl. No.: 15/531,089

(22) PCT Filed: Nov. 26, 2014

(86) PCT No.: PCT/IB2014/066366
§ 371 (c)(1),
(2) Date: May 26, 2017

(87) PCT Pub. No.: WO2016/083870
PCT Pub. Date: Jun. 2, 2016

(65) Prior Publication Data
US 2017/0320215 A1 Nov. 9, 2017

(51) Int. Cl.
H01L 29/06 (2006.01)
A01D 34/00 (2006.01)
(Continued)

(52) U.S. Cl.
CPC .......... *A01D 34/008* (2013.01); *B25J 13/006* (2013.01); *G05D 1/0022* (2013.01);
(Continued)

(58) Field of Classification Search
CPC ........ B25J 13/006; A01D 34/008; H04L 9/14; H04L 9/3226
See application file for complete search history.

(56) References Cited

U.S. PATENT DOCUMENTS 6,975,729 B1 * 12/2005 Perlman ................ H04L 9/0841
380/277
8,195,358 B2 * 6/2012 Anderson ............ G05D 1/0287
701/30.3
(Continued)

FOREIGN PATENT DOCUMENTS

EP    2151729 A1   2/2010
WO   2013134615 A1   9/2013

OTHER PUBLICATIONS

International Search Report and Written Opinion for International Application No. PCT/IB2014/066366 dated Aug. 19, 2015, all enclosed pages cited.

(Continued)

Primary Examiner — Vance M Little
(74) Attorney, Agent, or Firm — Burr & Forman, LLP

(57) ABSTRACT

A method of providing remote control of a robotic vehicle may include receiving an instruction directing setup of a connection for communication between a robotic vehicle and an electronic device configurable to interface with the robotic vehicle remotely, providing a pairing code to one of the robotic vehicle or the electronic device for display of the pairing code at the one of the robotic vehicle or the electronic device, receiving an indication of entry of the pairing code at the other of the robotic vehicle or the initiate pairing electronic device, establishing a communication link for operably coupling the robotic vehicle and the electronic device responsive to receipt of the indication, and enabling an operator to remotely interact with the robotic vehicle at the electronic device via the communication link.

20 Claims, 8 Drawing Sheets

(51) Int. Cl.
  *G05D 1/00* (2006.01)
  *B25J 13/00* (2006.01)
  *H04L 9/08* (2006.01)
  *H04L 9/14* (2006.01)
  *H04L 9/32* (2006.01)
  *H04L 29/06* (2006.01)
  *H04W 12/04* (2009.01)
  *H04W 12/06* (2009.01)

(52) U.S. Cl.
  CPC ............. *H04L 9/0819* (2013.01); *H04L 9/14* (2013.01); *H04L 9/3226* (2013.01); *H04L 63/0428* (2013.01); *H04L 63/061* (2013.01); *H04L 63/083* (2013.01); *H04W 12/04* (2013.01); *H04W 12/06* (2013.01); *G05D 2201/0208* (2013.01)

(56) References Cited

U.S. PATENT DOCUMENTS

| | | | |
|---|---|---|---|
| 8,478,493 | B2 | 7/2013 | Anderson |
| 8,527,197 | B2 | 9/2013 | Poncelet born Morey |
| 8,560,145 | B2 * | 10/2013 | Anderson ............... G06N 5/043 701/1 |
| 8,666,587 | B2 | 3/2014 | Anderson |
| 2004/0162637 | A1 * | 8/2004 | Wang ...................... B25J 9/1689 700/245 |
| 2006/0083187 | A1 * | 4/2006 | Dekel ................. H04L 63/0853 370/310 |
| 2008/0044024 | A1 * | 2/2008 | Oh ......................... H04L 63/062 380/270 |
| 2010/0131103 | A1 | 5/2010 | Herzog et al. |
| 2012/0239221 | A1 * | 9/2012 | Mighdoll ................. H04L 67/10 700/300 |
| 2014/0235166 | A1 * | 8/2014 | Molettiere ............... H04B 7/26 455/41.2 |
| 2015/0095933 | A1 * | 4/2015 | Blackburn .......... H04M 7/0078 725/25 |
| 2015/0351145 | A1 * | 12/2015 | Burks .................... G08C 17/02 455/41.3 |
| 2015/0359022 | A1 * | 12/2015 | Lau ......................... H04W 4/08 455/41.2 |

OTHER PUBLICATIONS

International Preliminary Report on Patentability for International Application No. PCT/IB2014/066366 dated May 30, 2017, all enclosed pages cited.

MIT, "Human-Automation Collaboration for Unmanned Vehicle Control", http://web.mit.edu/aeroastro/labs/halab/multiuv.shtml, all enclosed pages cited.

* cited by examiner

REMOTE INTERACTION WITH A ROBOTIC VEHICLE

TECHNICAL FIELD

Example embodiments generally relate to robotic devices and, more particularly, relate to a robotic device that is configured for secure interaction with a remote controlling device that may sometimes further control a plurality of such robotic devices.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Robotic mowers are typically capable of transiting over even and uneven terrain to execute yard maintenance activities relating to mowing. They may be programmed to stay within a defined area while performing their mowing tasks, and may even be configured to perform other tasks in the defined area. Thus, it may be desirable to expand the capabilities of robotic mowers to improve their utility and functionality.

BRIEF SUMMARY OF SOME EXAMPLES

Some example embodiments may therefore provide a robotic vehicle that can be controlled securely from a remote controlling device for user interaction in a variety of ways. However, in some cases, the remote controlling device may securely control a plurality of robotic vehicles.

In an example embodiment, a method of providing remote control of a robotic vehicle is provided. The method may include receiving an instruction directing setup of a connection for communication between a robotic vehicle and an electronic device configurable to interface with the robotic vehicle remotely, providing a pairing code to one of the robotic vehicle or the electronic device for display of the pairing code at the one of the robotic vehicle or the electronic device, receiving an indication of entry of the pairing code at the other of the robotic vehicle or the electronic device, establishing a communication link for operably coupling the robotic vehicle and the electronic device responsive to receipt of the indication, and enabling an operator to remotely interact with the robotic vehicle at the electronic device via the communication link.

In another example embodiment, an apparatus for remotely performing yard maintenance tasks is provide. The apparatus may be embodied as a robotic mower or other vehicle. The apparatus may include processing circuitry that may be configured to provide a request for a pairing code to an account manager responsive to user input; receive the pairing code from the account manager and display the pairing code at a display of the robotic mower; receive an instruction to establish a communication link with an electronic device paired with the robotic mower based on submission of the pairing code by the electronic device to the account manager; receive instructions directing operation of the robotic mower from the electronic device via the communication link.

Some example embodiments may improve the ability of robotic vehicles to provide utility for garden owners or other operators, specifically by enabling the garden owners to remotely control the vehicles.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
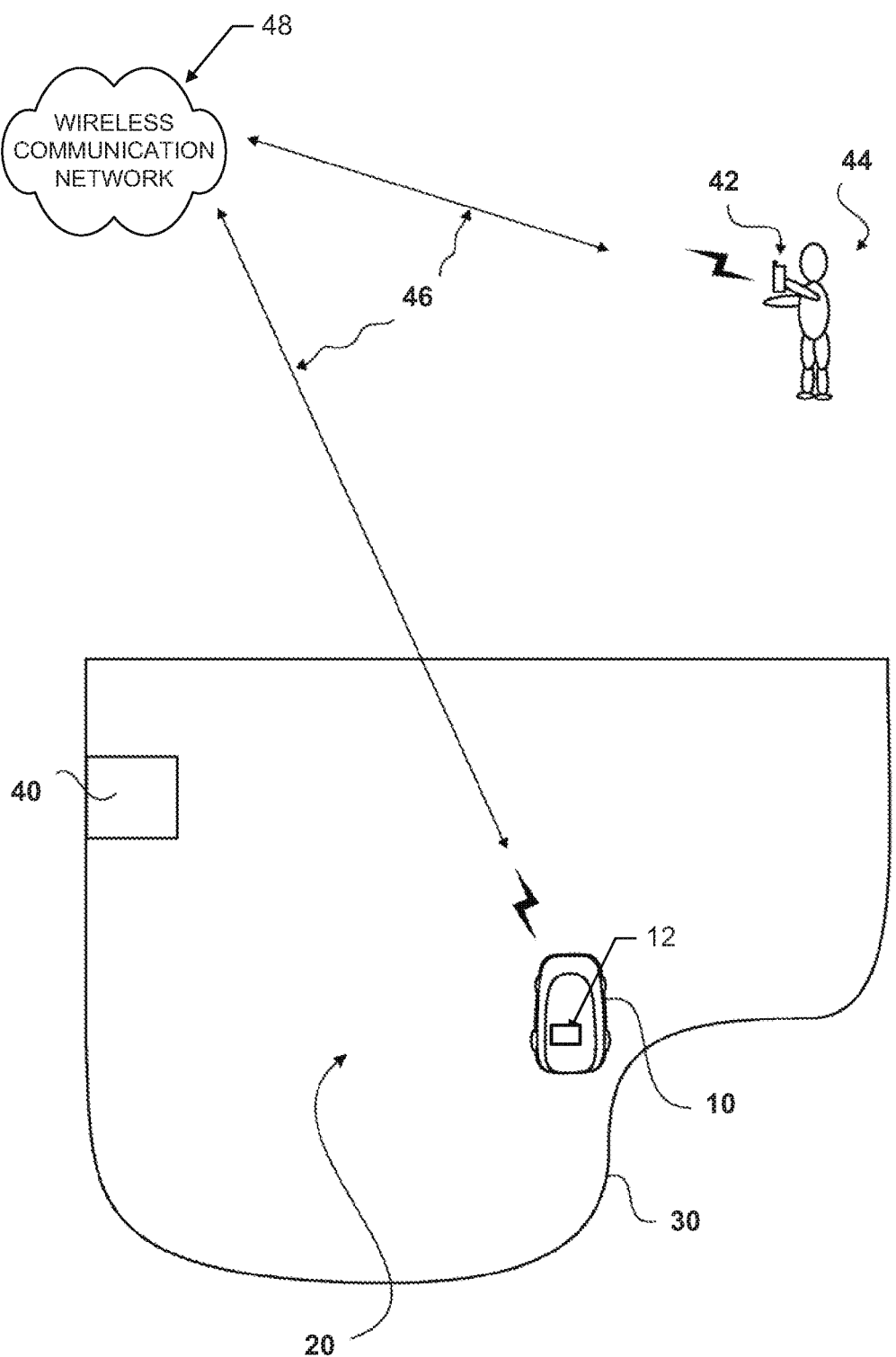
FIG. 1 illustrates an example operating environment for a robotic mower that may employ an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

In an example embodiment, a robotic vehicle (e.g., a robotic mower, mobile sensing device, watering device and/or the like) is configured to be controlled by a remote device as one of potentially a number of such vehicles that can be both remotely and securely managed by the remote device. The remote device is therefore provided with mechanisms by which to interact in a secure environment with the remote devices and provide control instructions to the same. The user may then interact with the robotic vehicles to undertake a variety of activities including, for example, defining work areas and/or tasks to be performed in various areas, recording content for presentation in association with the time the content was recorded to provide an event log with accessible image content, detecting/notifying the operator of various changes to the environment, and/or the like. Other functions may also be performed as described in greater detail below.

FIG. 1 illustrates an example operating environment for a robotic mower 10 that may be employed in connection with an example embodiment. However, it should be appreciated that example embodiments may be employed on numerous other robotic vehicles, so the robotic mower 10 should be recognized as merely one example of such a vehicle. The robotic mower 10 may operate to cut grass on a parcel 20 (i.e., a land lot or garden), the boundary 30 of which may be defined using one or more physical boundaries (e.g., a fence, wall, curb and/or the like), a boundary wire, programmed location based boundaries or combinations thereof. When the boundary 30 is a boundary wire, the boundary wire may emit electrical signals that are detectable by the robotic mower 10 to inform the robotic mower 10 when the boundary 30 of the parcel 20 has been reached.

The robotic mower 10 may be controlled, at least in part, via control circuitry 12 located onboard. The control circuitry 12 may include, among other things, a positioning module and a sensor module, which will be described in greater detail below. Accordingly, the robotic mower 10 may utilize the control circuitry 12 to define a path for coverage of the parcel 20 in terms of performing a task over specified portions or the entire parcel 20. In this regard, the positioning module may be used to guide the robotic mower 10 over the parcel 20 and to ensure that full coverage (of at least predetermined portions of the parcel 20) is obtained, while the sensor module may detect objects and/or gather data regarding the surroundings of the robotic mower 10 while the parcel 20 is traversed.

If a sensor module is employed, the sensor module may include a sensors related to positional determination (e.g., a boundary wired detector, a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors may be used, at least in part, for determining the location of the robotic mower 10 relative to boundaries or other points of interest (e.g., a starting point or other key features) of the parcel 20, or determining a position history or track of the robotic mower 10 over time. The sensors may also detect collision, tipping over, or various fault conditions. In some cases, the sensors may also or alternatively collect data regarding various measurable parameters (e.g., moisture, temperature, soil conditions, etc.) associated with particular locations on the parcel 20.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry 12 in a manner that enables the robotic mower 10 to systematically traverse the parcel while operating a cutting blade to cut the grass on the parcel 20. In cases where the robotic vehicle is not a mower, the control circuitry 12 may be configured to control another functional or working assembly that may replace the blade control system.

In some embodiments, the control circuitry 12 and/or a communication node at the charge station 40 may be configured to communicate wirelessly with an electronic device 42 (e.g., a personal computer, a cloud based computer, server, mobile telephone, PDA, tablet, smart phone, and/or the like) of a remote operator 44 (or user) via wireless links 46 associated with a wireless communication network 48. The wireless communication network 48 may provide operable coupling between the remote operator 44 and the robotic mower 10 via the electronic device 42, which may act as a remote control device for the robotic mower 10. However, it should be appreciated that the wireless communication network 48 may include additional or internal components that facilitate the communication links and protocols employed. Thus, some portions of the wireless communication network 48 may employ additional components and connections that may be wired and/or wireless. For example, the charge station 40 may have a wired connection to a computer or server that is connected to the wireless communication network 48, which may then wirelessly connect to the electronic device 42. As another example, the robotic mower 10 may wirelessly connect to the wireless communication network 48 (directly or indirectly) and a wired connection may be established between one or more servers of the wireless communication network 48 and a PC of the remote operator 44. In some embodiments, the wireless communication network 48 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. Accordingly, communication between the wireless communication network 48 and the devices or databases (e.g., servers, electronic device 42, control circuitry 12) may be accomplished by either wireline or wireless communication mechanisms and corresponding protocols.

Figure 2:
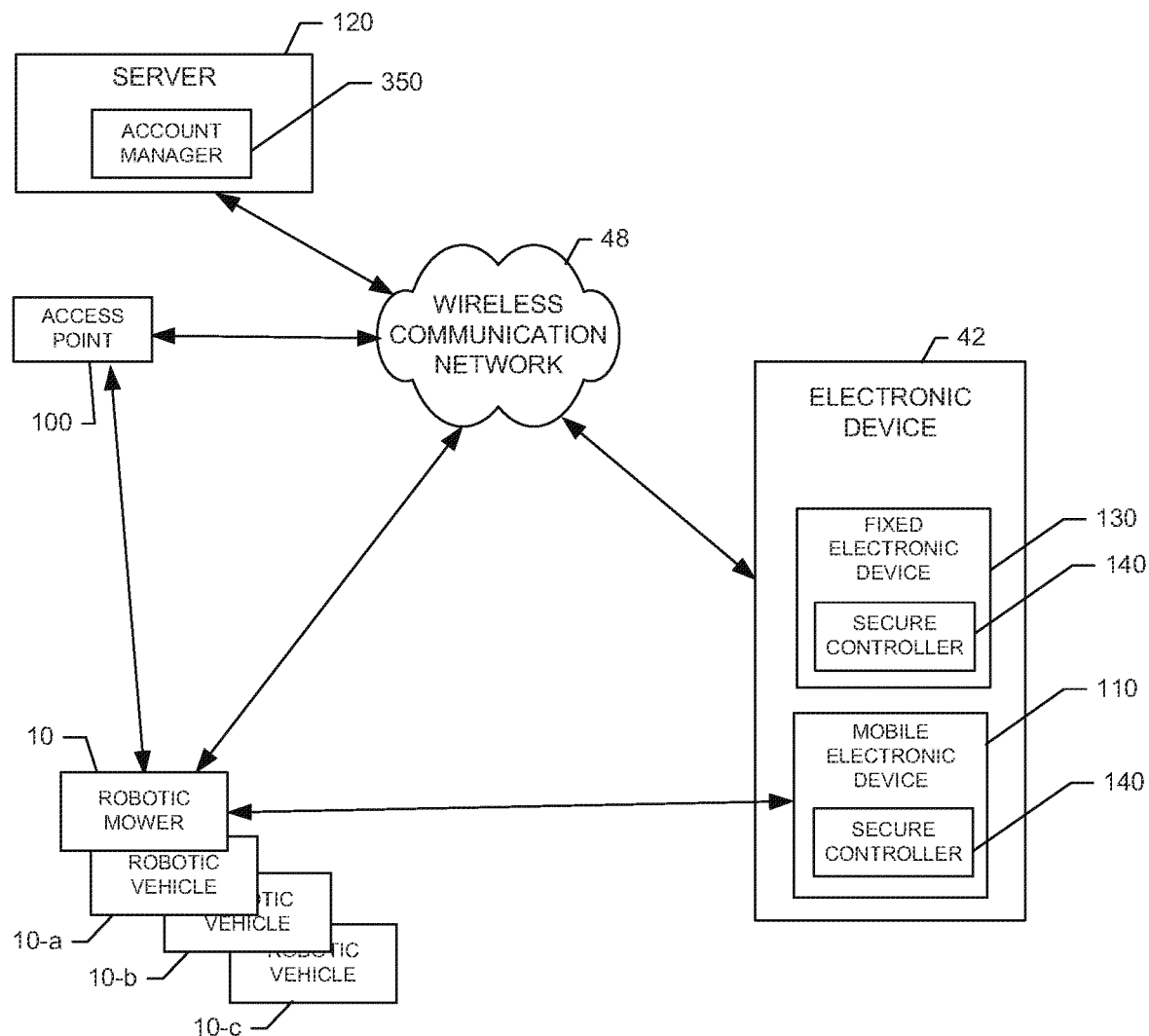
FIG. 2 illustrates a block diagram of a communication network of the robotic mower according to an example embodiment.

FIG. 2 illustrates a block diagram of various components that may be employed to provide secure, remote control of robotic vehicles in accordance with an example embodiment. As can be seen from FIG. 2, the wireless communication network 48 (e.g., the internet) may be capable of providing communication between the electronic device 42 and the robotic mower 10. When communication is established between the wireless communication network 48 and the robotic mower 10, the communication may be established using any suitable wireless communication mechanism such as, for example, second-generation (2G) wireless communication protocols IS-136 (TDMA), GSM, and IS-95 (CDMA), third-generation (3G) wireless communication protocols, such as UMTS, CDMA2000, WCDMA and TD-SCDMA, LTE or E-UTRAN, fourth-generation (4G) wireless communication protocols or the like. However, in some cases, a wireless access point 100 may be provided in association with the parcel 20 to serve the robotic mower 10. The wireless access point 100 may have a wired or wireless connection to the wireless communication network 48, and may then employ a short range communication protocol (e.g., WiFi, Bluetooth, or the like) to communicate with the robotic mower 10. In still other embodiments, such as when the electronic device 42 is embodied as a mobile electronic device 110, the mobile electronic device 110 may employ a short range communication protocol (e.g., WiFi, Bluetooth, or the like) to communicate with the robotic mower 10 to communicate directly with the robotic mower 10.

Regardless of the particular communication mechanism employed, it should be appreciated that user interaction between the electronic device 42 and the robotic mower 10 is facilitated by example embodiments. In some cases, information regarding the robotic mower 10, the parcel 20, the remote operator 44, account details associated with any of the foregoing, and/or the like, may be stored "in the cloud." For example, a server 120 may be provided as part of, or in communication with, the wireless communication network 48. The server 120 may include memory and/or processing components to store data and execute functionality associated with the employment of example embodiments. Thus, for example, instructions for operation of the robotic mower 10, boundary details or information about tasks to be performed on the parcel 20, account information, registered users or devices, and/or other information may be stored at the server 120.

In some cases, the manufacturer may provide an identifier, vehicle identification number, or other such identifying information regarding each robotic vehicle produced to the server 120 (or an instance thereof). The identification information may uniquely identify each instance of robotic vehicle and enable each respective robotic vehicle to be registered to a user, organization, parcel and/or user account. The server 120 may therefore store account information and correlate various account settings, programs, instructions, applications and/or the like, with the account generally or in association with all or particular ones of the robotic vehicles registered to the account. In some examples, actions of the server 120 may be controlled, managed, or coordinated by a controlling device (e.g., account manager 350). The server 120 may interact with the electronic device 42 and/or the robotic mower 10 (or other robotic vehicles) individually in sequence or simultaneously in order to update, modify, execute or otherwise perform functions associated with the accounts and vehicles associated with the accounts.

In some embodiments, in addition or as an alternative to the mobile electronic device 110, the electronic device 42 could be embodied as a fixed electronic device 130 (e.g., a PC, computer terminal and/or the like). Thus, the remote operator 44 could be enabled to control the robotic mower 10 via the fixed electronic device 130 or via the mobile electronic device 110 (e.g., a smart phone, tablet, laptop, etc.). In some cases, the user may be enabled to log into an account associated with the user (or with the parcel 20, an organization responsible for the parcel 20, and/or the like) to manage tasks or data associated with the robotic mower 10 or with other robotic vehicles (e.g., robotic vehicle 10-*a*, robotic vehicle 10-*b*, and robotic vehicle 10-*c*) that may be associated with the account. In any case, a communication controller 140 may be embodied at the device from which instructions or other data/information associated with controlling the operation of the robotic mower 10 (or other robotic vehicles) associated with the account. Accordingly, for example, an instance of the communication controller 140 may be embodied at any (or each) device that is capable of remotely interacting with the robotic mower 10 (or other robotic vehicles).

Figure 3:
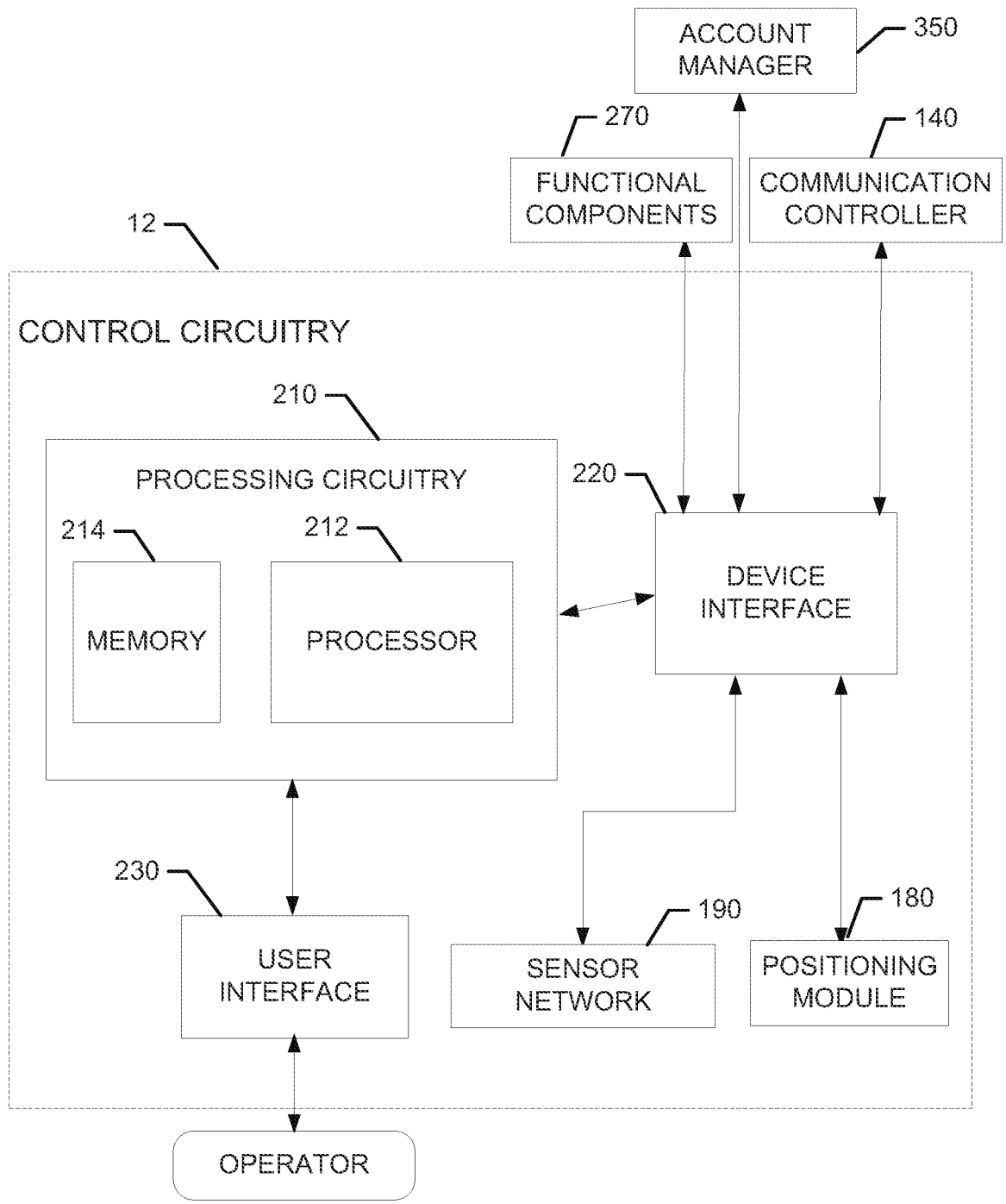
FIG. 3 illustrates a block diagram of various components of processing circuitry of the robotic mower to illustrate some of the components that enable the functional performance of the robotic mower and to facilitate description of an example embodiment.

Some examples of the interactions that may be enabled by example embodiments will be described herein by way of explanation and not of limitation. FIG. 3 illustrates a block diagram of various components of the control circuitry 12 to illustrate some of the components that enable the functional performance of the robotic mower 10 and to facilitate description of an example embodiment. In some example embodiments, the control circuitry 12 may include or otherwise be in communication with a positioning module 180 and/or a sensor network 190 disposed at the robotic mower 10. As such, for example, the functions attributable to the positioning module 180 and/or the sensor network 190 may be carried out by the control circuitry 12.

The control circuitry 12 may include processing circuitry 210 that may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230. As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate with electronic components and/or sensors of the robotic mower 10 via a single data bus. As such, the data bus may connect to a plurality or all of the switching components and/or other electrically controlled components of the robotic mower 10.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry in the form of processing circuitry 210) capable of performing operations according to embodiments of the present invention while configured accordingly.

Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the positioning module 180, the sensor network 190, and/or other functional components 270 of or associated with the robotic mower 10. As such, in some embodiments, the processor 212 (or the processing circuitry 210) may be said to cause each of the operations described in connection with the positioning module 180, the sensor network 190, and/or other functional components 270 by directing the positioning module 180, the sensor network 190, and/or other functional components 270, respectively, to undertake the corresponding functionalities responsive to execution of instructions or algorithms configuring the processor 212 (or processing circuitry 210) accordingly. These instructions or algorithms may configure the processing circuitry 210, and thereby also the robotic mower 10, into a tool for performing corresponding functions in the physical world in accordance with the instructions provided.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the positioning module 180, the sensor network 190, and/or other functional components 270 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from various sensors or components of the robotic mower 10. Among the contents of the memory 214, applications may be stored for execution by the processor 212 in order to carry out the functionality associated with each respective application.

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display, one or more buttons or keys (e.g., function buttons), and/or other input/output mechanisms (e.g., microphone, speakers, cursor, joystick, lights and/or the like).

The device interface 220 may include one or more interface mechanisms for enabling communication with other devices either locally or remotely (e.g., the communication controller 140). In some cases, the device interface 220 may be any means such as a device or circuitry embodied in either hardware, or a combination of hardware and software that is configured to receive and/or transmit data from/to sensors or other components in communication with the processing circuitry 210. In some example embodiments, the device interface 220 may provide interfaces for communication of data from the communication controller 140, the positioning module 180, the sensor network 190, and/or other functional components 270 via wired or wireless communication interfaces in a real-time manner, as a data package downloaded after data gathering or in one or more burst transmission of any kind.

The positioning module 180 may be configured to utilize one or more sensors to determine a location of the robotic mower 10 and direct continued motion of the robotic mower 10 to achieve appropriate coverage of the parcel 20. As such, the robotic mower 10 (or more specifically, the control circuitry 12) may use the location information to determine a mower track and provide full coverage of the parcel 20 to ensure the entire parcel is mowed. The positioning module 180 may therefore be configured to direct movement of the robotic mower 10, including the speed of the robotic mower 10. Various sensors of sensor network 190 the robotic mower 10 may be included as a portion of, or otherwise communicate with, the positioning module 180 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation as part of the positioning module 180.

Figure 4:
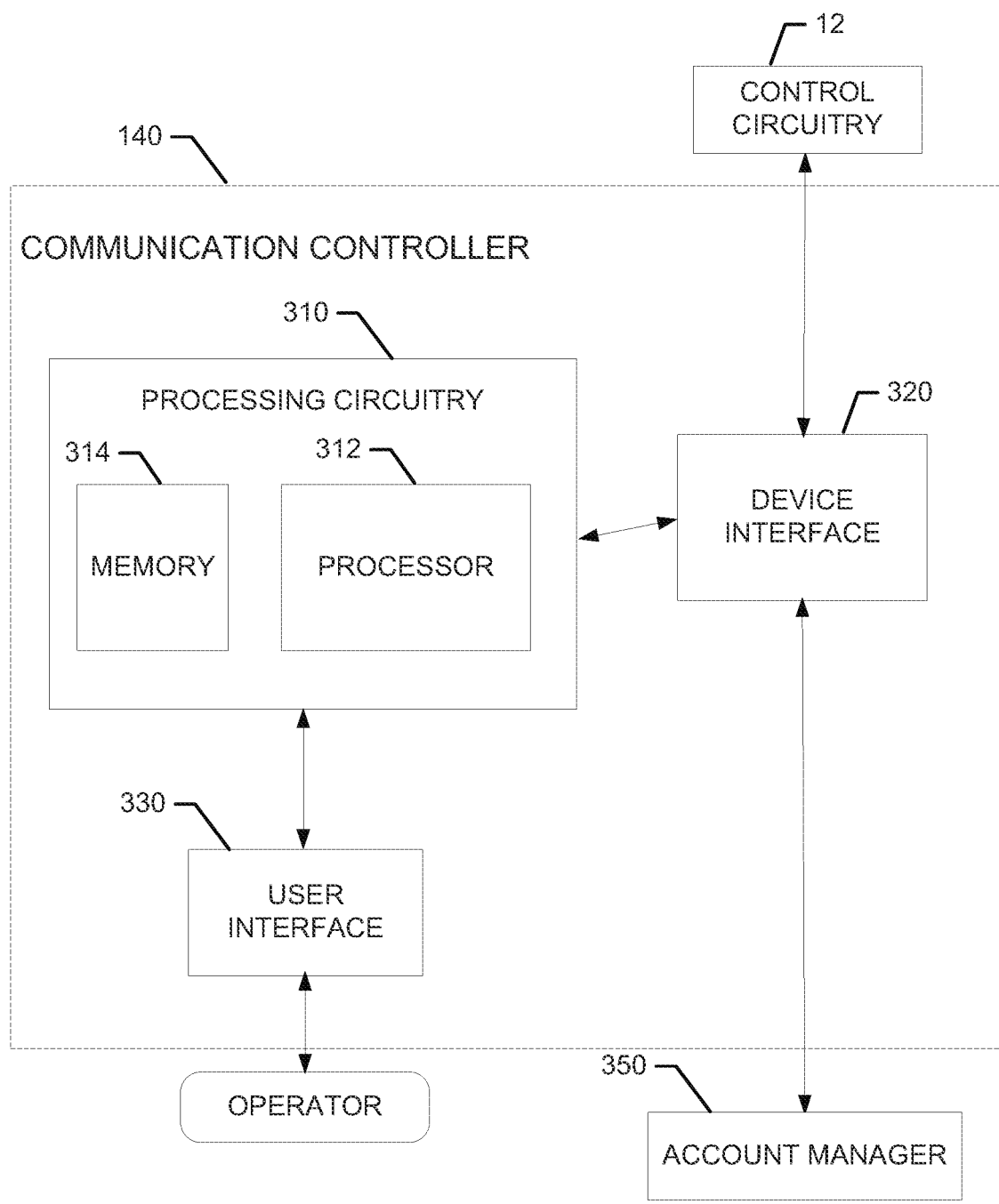
FIG. 4 illustrates a block diagram of various components of processing circuitry of an electronic device that can control the robotic mower remotely to illustrate some of the components that enable the functional performance of the electronic device and to facilitate description of an example embodiment.

In an example embodiment, as mentioned above, the communication controller 140 may interface with the control circuitry 12 for remote control of the robotic mower 10. The remote interaction may also be used for account management services, data gathering, task performance and/or the like. FIG. 4 illustrates a block diagram of the communication controller 140 of an example embodiment.

As shown in FIG. 4, the communication controller 140 may include processing circuitry 310 that may be configured to perform data processing, control function execution and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320 and, in some cases, a user interface 330. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of a programmable computer.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be configured to generate control consoles, user interface icons, control menus, option selections, input boxes, display-based interaction mechanisms, and/or the like by which the user may be enabled to provide instructions or other inputs for interaction with the server 120 and/or the robotic mower 10. As such, in some embodiments, the processor 312 (or the processing circuitry 310) may be said to cause each of the operations described in connection with the communication controller 140 by directing the communication controller 140 to undertake the corresponding functionalities responsive to execution of instructions or algorithms configuring the processor 312 (or processing circuitry 310) accordingly. These instructions or algorithms may configure the processing circuitry 310, and thereby also transform the communication controller 140, into a tool for performing corresponding functions in the physical world in accordance with the instructions provided such as, for example, providing interface mechanisms for controlling the operation of the robotic mower 10 relative to mowing, gathering data, reporting data gathered or other activity, and/or the like, for controlling the pairing of the robotic mower 10 with the electronic device, and/or for updating or modifying programs or applications that relate to settings or other activities of the accounts and devices associated with accounts that the user of the electronic device 42 is authorized to access.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the communication controller 140 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. Among the contents of the memory 314, applications may be stored for execution by the processor 312 in order to carry out the functionality associated with each respective application. In some cases, the applications may include an application for providing the interface consoles, screens, prompts and/or the like to enable the user to interface with the robotic mower 10 or interface with an account associated with the robotic mower 10, the parcel 20 or an organization associated with the robotic mower 10, the user, or the parcel 20.

The user interface 330 may be in communication with the processing circuitry 310 to receive an indication of a user input at the user interface 330 and/or to provide an audible, visual, mechanical or other output to the user. As such, the user interface 330 may include, for example, a display, one or more buttons or keys (e.g., function buttons, keyboard, etc.), and/or other input/output mechanisms (e.g., microphone, speakers, cursor, joystick, lights and/or the like).

The device interface 320 may include one or more interface mechanisms for enabling communication with other devices either locally or remotely (e.g., the remote mower 10 or the other remote vehicles). In some cases, the device interface 320 may be any means such as a device or circuitry embodied in either hardware, or a combination of hardware and software that is configured to receive and/or transmit information or data from/to devices or other components in communication with the processing circuitry 310. In some example embodiments, the device interface 320 may provide interfaces for communication of data to and/or from the remote mower 10 or the other remote vehicles via wired or wireless communication interfaces in a real-time manner. Interfaces for directing remote control of such vehicles may be provided as a data package downloaded from the server 120 in one or more burst transmissions of any kind.

Figure 5:
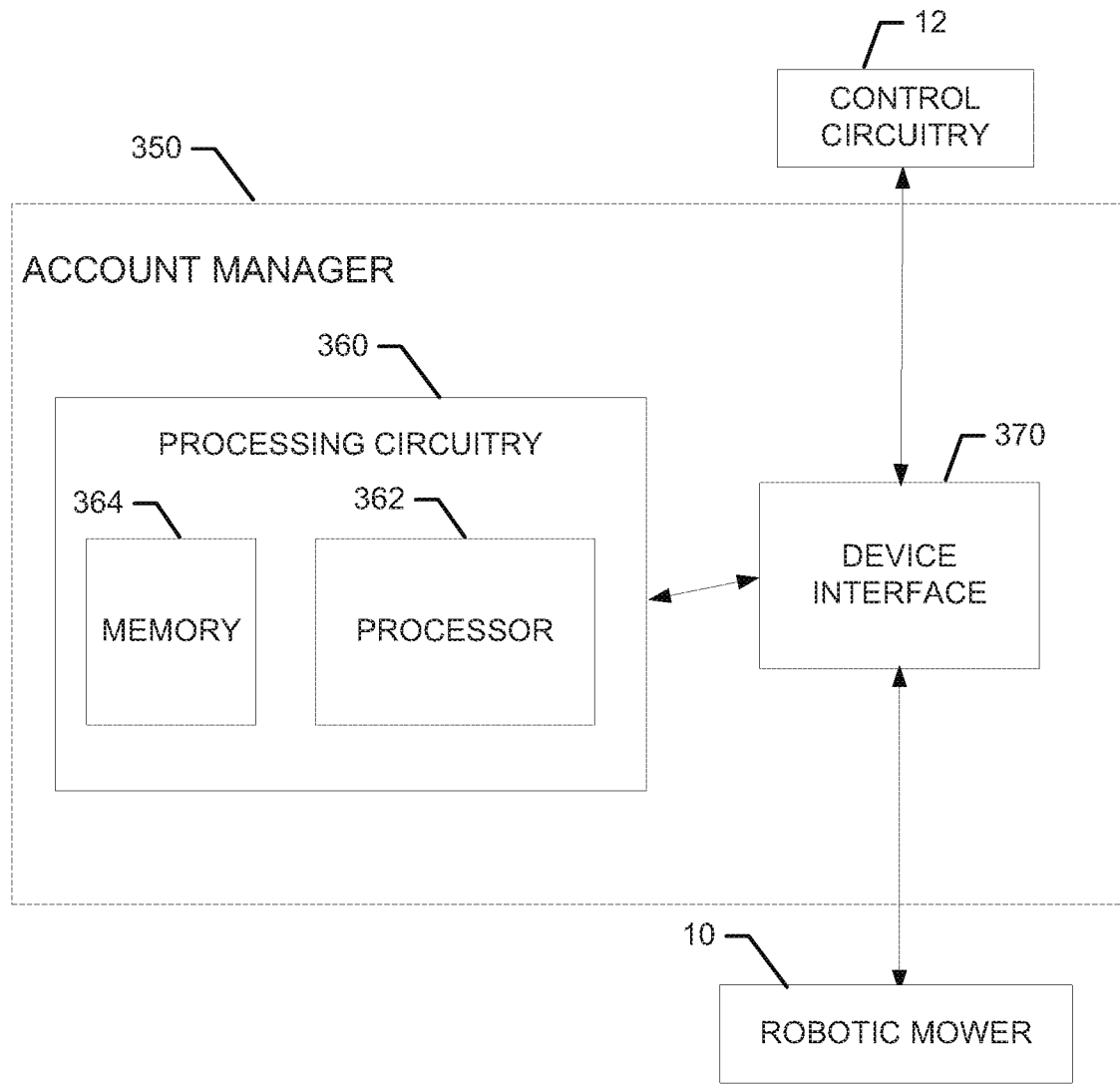
FIG. 5 illustrates a block diagram of various components of processing circuitry of a server and account manager that can interact with the electronic device and the robotic mower remotely to illustrate some of the components that enable the functional performance of the robotic mower and to facilitate description of an example embodiment.

In some embodiments, the server 120 may include the account manager 350, which may be embodied as or otherwise include processing circuitry 360. The processing circuitry 360 may include a processor 362 and memory 364 as shown in FIG. 5. The processing circuitry 360 may also include a device interface 370. The processor 362, memory 364 and device interface 370 may be similar in function (and in some cases also form) to the processor 312, memory 314 and device interface 320 described above. Thus, specific descriptions of these components will not be repeated.

In an example embodiment, the processor 362 (or the processing circuitry 360) may be said to cause each of the operations described in connection with the account manager 350 by directing the account manager 350 to undertake the corresponding functionalities responsive to execution of instructions or algorithms configuring the processor 362 (or processing circuitry 360) accordingly. These instructions or algorithms may configure the processing circuitry 360, and thereby also transform the account manager 350, into a tool for performing corresponding functions in the physical world in accordance with the instructions provided such as, for example, directing the operation of the robotic mower 10 relative to mowing, gathering data, reporting data gathered or other activity, and/or the like, receiving instructions or account setting information from a user at the electronic device 42, and/or the like.

In an exemplary embodiment, the memory 364 may be configured to store information, data, applications, instructions or the like for enabling the account manager 350 to carry out various functions in accordance with exemplary embodiments of the present invention. For example, the memory 364 could be configured to buffer input data for processing by the processor 362. Additionally or alternatively, the memory 364 could be configured to store instructions for execution by the processor 362. As yet another alternative, the memory 364 may include one or more databases that may store a variety of data sets responsive to input from various sensors or components of the robotic mower 10. Among the contents of the memory 364, applications may be stored for execution by the processor 362 in order to carry out the functionality associated with each respective application. In some cases, the applications may include an application for storing and manipulating account information; facilitating setting up of communication links between paired devices; storing information such as routes, programs, task lists and/or the like. Additionally or alternatively, for example, the applications may include one or more algorithms for directing operation of the robotic mower 10 for capturing data, mowing, performing other actions, and/or the like. In some cases, one or more applications may be provided for account setup, device registration, account management, notifications, adjusting settings, fleet management and/or the like as described herein.

The account manager 350 may be embodied as any device or means embodied in either hardware, software, or a combination of hardware and software configured to provide the interfaces and executable instructions for managing an account associated with the robotic mower 10 (or other robotic vehicles), the user, the parcel 20, or an organization associated with any of the above. Thus, for example, the account manager 350 may, in some cases, include an application having stored instructions that when executed by hardware (i.e., the processing circuitry 360), cause the processing circuitry 360 to be transformed into a tool for establishing a secure way of ensuring that remotely originated vehicle and/or account management instructions are being provided from an authorized user. As such, the account manager 350 may control device pairing, updating of account settings, provision of anti-theft services, storage and management of position information and status information, error notification, connectivity, analytics, fleet management, and remote control functions. More information about some of these services is provided herein.

By using the user interfaces 230 and 330 at the robotic mower 10 and the communication controller 140, respectively, initial pairing of the robotic mower 10 to an account with which the user or parcel is associated may be accomplished. Account information may be maintained at the server 120. Additionally, a listing of all distributed assets (i.e., robotic vehicles) may also be stored at the server 120. Using the processes described herein, the assets may be associated with corresponding accounts to allow remote monitoring and/or managing of the assets. Accordingly, the user may initially employ the communication controller 140 at any instance of the electronic device 42 to execute the account manager 350 applications or functionality to setup a new account or login to an existing account. Thus, for example, the user may identify or create an account and enter or create a valid password for the account. As mentioned above, the account may be associated with one or more vehicles, the user, a parcel, or an organization associated with any of the preceding entities.

Once the user has properly authenticated himself/herself and obtained access to the account, the user may select any of various options for control of various aspects of the account. For example, the user may select an option to add a new device to the account. For example, if the user is adding one or more of the robotic mower and the other robotic vehicles to the account, the user may select the add new device option to receive instructions on how to add the new device. However, since the process for adding a new device is actually initiated at the device itself (e.g., at the robotic mower 10), the presentation or use of instructions is not necessary as the user may just directly initiate pairing at the device.

To initiate pairing, the user may use the user interface 230 of the control circuitry 12 of the robotic mower 10 to select an option for adding the mower to an account or otherwise pairing the robotic mower 10 with a control device (e.g., the electronic device 42) via the wireless communication network 48. The control circuitry 12 may then establish a connection to the server 120. In some cases, an identity of the robotic mower 10 may be determined, although the identity need not be known in all cases. After the connection is established, the robotic mower 10 may request a pairing code. The server 120 may provide the pairing code to the robotic mower 10, which may then display the pairing code using the user interface 230.

Responsive to receipt of the pairing code, the user may enter the pairing code (via user interface 330) into the account manager 350 at the electronic device 42. The account manager 350 may then interface with the server 120 to associate the device receiving the corresponding pairing code (i.e., the robotic mower 10) with the account to which the user is logged in. Accordingly, the robotic mower 10 is paired with the electronic device 42 so that the electronic device 42 can remotely control the robotic mower 10 and perform any other functions that are executable via the account manager 350 as described herein.

In an alternative embodiment, the pairing sequence could be altered slightly. For example, the pairing code could be requested instead by the electronic device 42 and entered into the robotic mower 10 to cause the pairing described above. Thus, the device initiating the pairing could either be the robotic mower 10 or the electronic device 42 that will act as a remote control device for the robotic mower 10.

Each robotic vehicle may be enabled to be registered to any number of electronic devices that are associated with a given account. Thus, for example, if a company that manages the operation of a fleet of robotic vehicles has a plurality of electronic devices and perhaps also users, the account for the company may allow any number of devices and users to be paired with multiple ones of the robotic vehicles of the fleet. Thus, for example, one user or electronic device could be paired with each of the robotic mower 10, and the robotic vehicles 10-*a*, 10-*b* and 10-*c*. Meanwhile, another user or electronic device may only be paired with the robotic mower 10 and the robotic vehicle 10-*a*, while a different user or electronic device is paired with the robotic mower 10 and the robotic vehicle 10-*c*. Any combination of devices and vehicles within a particular account may be allowable. Furthermore, in some cases, one robotic vehicle may be controlled from a plurality of different accounts, since pairing could be repeated for various different accounts. However, in some cases, robotic vehicles may only be enable to be registered with a single account. Thus, for example, a robotic vehicle registered to the given account may not be registered to another account until the robotic vehicle is first removed from the given account. This protection may guard against theft of robotic vehicles since, for example, a prior owner must remove the robotic vehicle from its account before a new owner can register a pairing with the robotic vehicle.

Figure 6:
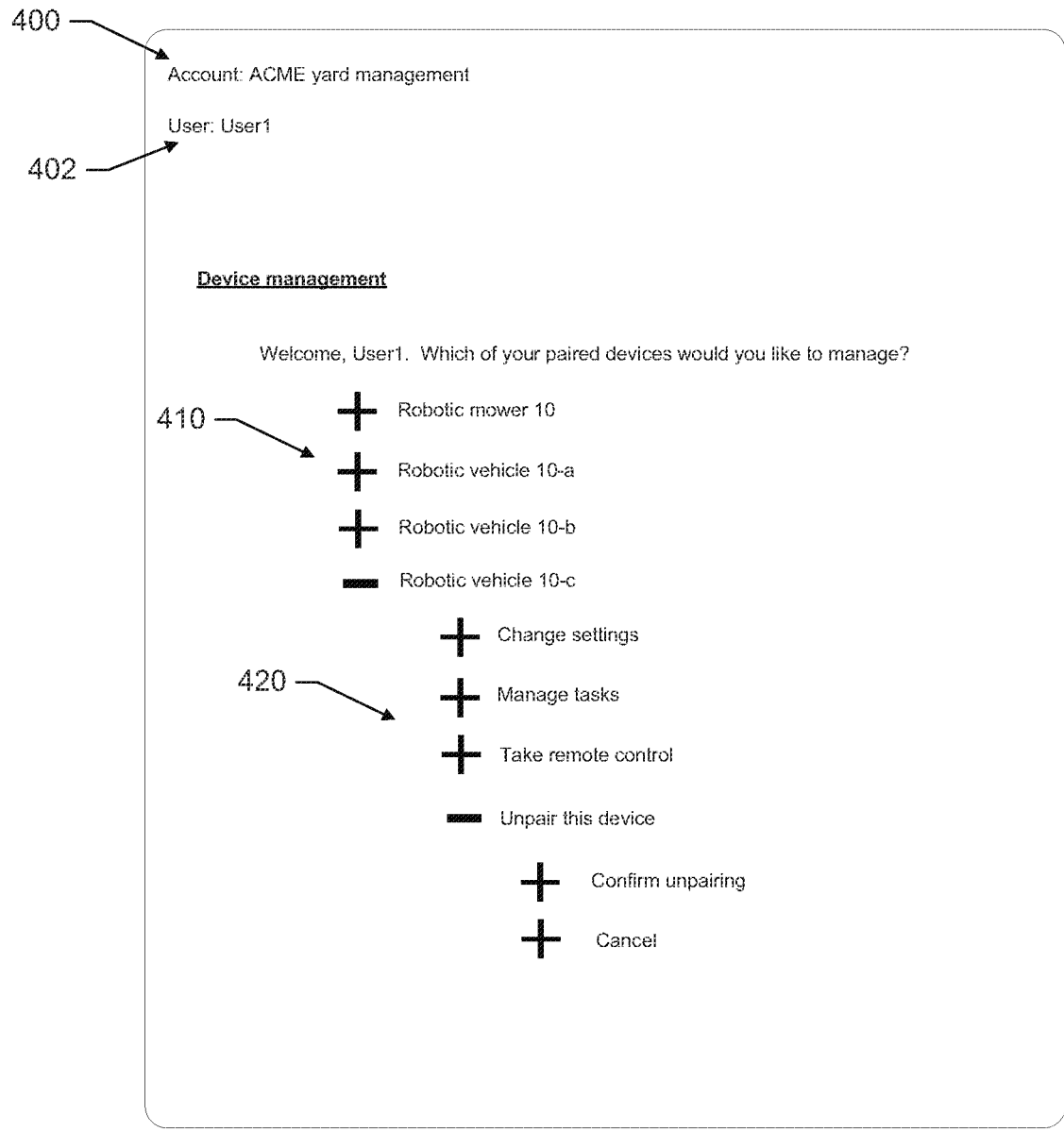
FIG. 6 illustrates a sample user interface page for an application for controlling the robotic mower according to an example embodiment.

In an example embodiment, a control console similar to that shown in FIG. 6 may be provided in some cases. However, it should be appreciated that the control console of FIG. 6 is merely an example to facilitate explanation of some of the functional capabilities of the account manager 350. In any case, the control console may provide an indication of the account identity 400 and the user identity 402 for the login information provided. In some cases, separate pages may be provided for general account management, for user permissions and account settings, and for device management, among other things. FIG. 6 illustrates a device management page, but it should be appreciated that multiple functions may be accessible from a single page, and other pages may also be provided in various example embodiments. A listing of options may then be provided to the user to facilitate the performance of various management tasks associated with the page being viewed.

As can be seen from FIG. 6, a listing of vehicles 410 associated with the account and/or user may initially be provided. Once a particular vehicle is selected (in this case robotic vehicle 10-c is selected), a list of management options 420 may be provided for the corresponding vehicle. In this example, management options include changing vehicle settings, managing tasks, taking remote control of the vehicle and unpairing of the device. Although the management options of this page are focused on execution on a device-by-device basis, it should be appreciated that some options (e.g., unpairing of devices) could be performed on global scale on other management levels.

In some cases, options selected may require confirmation (e.g., such as unpairing a device), but in other cases, selection of an option may launch a corresponding different control console for the particular task. For example, if "change settings" is selected, a separate control console listing all available settings that can be adjusted may be provided. If "manage tasks" is selected, a separate control console listing tasks that can be assigned or programmed for the vehicle may be provided. For example, programmed cutting of a particular area, a route to be followed, data to be gathered and/or reported, and other programmable tasks for the vehicle may be managed responsive to selection of this option.

In an example embodiment, if "take remote control" is selected, a separate control console may be launched to allow the user to control the device in real-time. In some cases, commands such as "park", "charge", "start", "stop", "report" and/or the like may be provided to direct specific general actions. However, in other cases, it may also be possible to view real-time location of the vehicle (e.g., on a map) and take manual control (albeit remotely) of the driving and/or task performance of the vehicle. In some cases, live video may be provided from the vehicle to facilitate guidance of the vehicle. When taking manual control of the vehicle, specific sensors or functional equipment (e.g., cameras, probes, cutters, and/or the like) may be engaged while the vehicle is directed to corresponding specific locations.

As can be appreciated from the descriptions above, the account manager 350 may be employed to provide the user with a robust capability for interacting with the robotic mower 10 for programmatic control or real-time control of the robotic mower 10. In some cases, the programmatic control may include programming the robotic mower 10 to respond to certain situations detected at the robotic mower 10. Thus, certain conditions detected (e.g., via the sensor network 190) may trigger corresponding responses and the conditions and/or responses may be programmed using the account manager 350. In some cases, the sensor network 190 may detect when the robotic mower 10 is removed from the parcel 20. In such cases, a local alarm at the robotic mower 10 may be triggered. Additionally or alternatively, a notification may be sent from the robotic mower 10 to the server 120 and/or the electronic device 42 to alert the user of the removal from the parcel 20 (e.g., via email, MMS or other alerting mechanisms). In other cases, the robotic mower 10 may be programmed to avoid operation during certain detectable weather conditions (or when such conditions are reported via internet connection), or avoid operation when other yard maintenance equipment is operating (e.g., when an irrigation system is operating).

In some embodiments, position and status updates may routinely, continuously, or periodically be provided to the server 120 and/or the electronic device 42. If provided to the server 120, the user may be enabled to monitor such status information when logged in at the electronic device 42. However, the account manager 350 may enable the user to define specific events or triggers that will cause the server 120 to notify the user upon any such occurrences being reported to the server 120. Error or fault conditions may also result in notifications being provided from the robotic mower 10 to the server 120 and/or the electronic device 42. Other conditions, such as service related conditions, may be monitored at the server 120 and the user may be notified when corresponding service conditions warrant attention. Data for troubleshooting or other analytics may also be provided from the robotic mower 10 to the server 120 and/or the electronic device 42. Thus, the account manager 350 may further provide a mechanism by which to troubleshoot various device performance issues.

In some cases, the communications between the robotic mower 10 and the server 120 and/or the electronic device 42 may employ secure connections. Security may be provided via a number of different mechanisms. For example, in some cases, the location and/or identity of the server 120 may be hidden from the user. Thus, when the robotic mower 10 initially contacts the server 120, the server 120 identity remains hidden from the customer, and cannot be changed. Another security feature may be that a PIN is issued with the purchase of the robotic mower 10. The PIN must then be entered when the robotic mower 10 is paired with an electronic device 42 to ensure that the rightful owner of the robotic mower 10 is attempting to register the device. In some cases, all messages between the robotic mower 10 and the server 120 and/or the electronic device 42 may be encrypted after pairing is complete. Moreover, the encryption key may never itself be transferred. The encryption key may be created from a pre-shared key (PSK) that is known to both the robotic mower 10 and the device with which it communicates, and that remains a hidden number. The PSK may be stored in the robotic mower 10 by the supplier, and may be separately provided to the server 120 by the mower supplier (i.e., the server 120 may get a whitelist). In some cases, during pairing, when the robotic mower 10 identifies itself to the server 120, the server 120 may be configured to generate the encryption key. The encryption key may include two or several parts, and the encryption key may be unique for every robotic vehicle.

Accordingly, if a robotic vehicle is sold and paired, but is then resold, the new user can initiate an unpairing sequence, as described above, to remove the pairing between the vehicle and the first user at the server 120. The new user may not need to access the first user's account in order to initiate and execute this unpairing. The unpairing also removes the pairing between the first user and the vehicle without having access to the mower.

Figure 7:
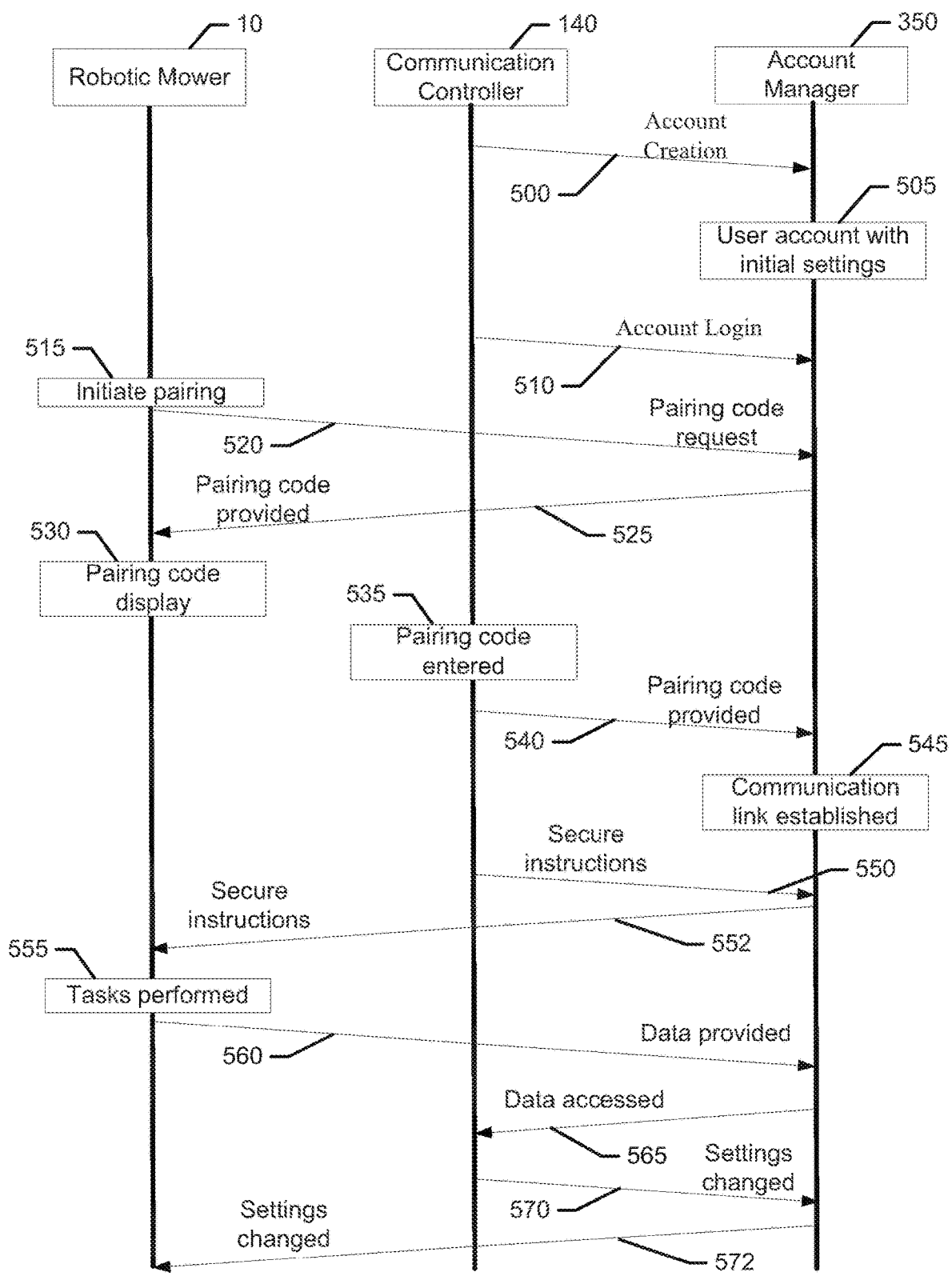
FIG. 7 illustrates a control flow diagram of example communications for setting up pairing of devices and thereafter initiating remote control in accordance with an example embodiment.

FIG. 7 illustrates a control flow diagram of example communications for setting up pairing of devices and thereafter initiating remote control in accordance with an example embodiment. As shown in FIG. 7, the communication controller 140 of the electronic device 42 may be used for initial account setup and creation at operation 500. The user account 505 may be created with initial settings defined by default and/or by the user. Thereafter, the user may login to the account at operation 510 at some time using the communication controller 140. An input may then be entered at the robotic mower 10 to initiate pairing at operation 515. A pairing code request may then be communicated to the account manager 350 at operation 520. The pairing code may be provided, responsive to the request, at operation 525. Upon receipt of the pairing code, the pairing code may be displayed at the robotic mower 10 at operation 530. The user may see the pairing code and enter it into the communication controller 140 at operation 535. The pairing code may be transmitted to the account manager 350 at operation 540 and the account manager 350 may establish a communication link at operation 545. The communication link may be direct or indirect, and may allow the communication controller 140 to send secure instructions to the account manager 350 at operation 550 for the account manager 350 to relay to the robotic mower 10 at operation 552. Various tasks may then be performed in accordance with the instructions provided at operation 555. At operation 560, data may be provided to the account manager 350 relating to robotic mower 10 activity. This data may be accessed at operation 565 by the communication controller 140 either in real time or after the fact. If desired, the user may change settings associated with the account by providing settings changes to the account manager 350 at operation 570. As appropriate, settings changes may then be provided to the robotic mower 10 by the account manager 350 as shown at operation 572.

It should be appreciated that some operations of FIG. 7 could be performed on different devices and in different orders. For example, the initiation of pairing and display of the pairing code could be accomplished at the communication controller 140 and the pairing code may be witnessed and entered at the robotic mower 10, as described above.

Embodiments of the present invention may therefore be practiced using an apparatus such as the one depicted in FIGS. 3-5, in connection with the system of FIG. 2. However, it should also be appreciated that some embodiments may be practiced in connection with a computer program product for performing embodiments or aspects of the present invention. As such, for example, each block or step of the flowchart of FIG. 8, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 214, 314 and/or 364) and executed by processing circuitry (e.g., processor 212, 312 and/or 362).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIG. 8. Moreover, other methods derived from the descriptions provided herein may also be performed responsive to execution of steps associated with such methods by a computer programmed to be transformed into a machine specifically configured to perform such methods.

In an example embodiment, a method for providing remote control of a robotic vehicle may include receiving an instruction directing setup of a connection for communication between a robotic vehicle and an electronic device configurable to interface with the robotic vehicle remotely at operation 600, providing a pairing code to one of the robotic vehicle or the electronic device for display of the pairing code at the one of the robotic vehicle or the electronic device at operation 610, receiving an indication of entry of the pairing code at the other of the robotic vehicle or the electronic device at operation 620, establishing a communication link for operably coupling the robotic vehicle and the electronic device responsive to receipt of the indication at operation 630, and enabling an operator to remotely interact with the robotic vehicle at the electronic device via the communication link at operation 640.

The operations 600-640 may also be modified, augmented or amplified in some cases. For example, in some embodiments, (1) establishing the communication link may include employing an encryption key for messages exchanged over the communication link. In some embodiments, (2) employing the encryption key comprises employing a pre shared key (PSK) that is not transferred. In some cases, whether or not (1) and (2) are employed, (3) providing the pairing code may include providing the pairing code for display at the robotic vehicle and the indication may be received from the electronic device. As an alternative, whether or not (1) and (2) are employed, (4) providing the pairing code may include providing the pairing code for display at the electronic device and the indication may be received from the robotic vehicle.

In some cases, any or all of (1) to (4) may be employed and the method may be modified such that operations 600 to 640 are repeated for one or more additional robotic vehicles. Additionally or alternatively, for example, the communication link may enable the electronic device to remotely control the multiple robotic vehicles. Additionally or alternatively, the communication link may enable the electronic device to remotely control the robotic vehicle in real-time. Additionally or alternatively, the communication link may enable the electronic device to define one or more operational programs for guiding future operation of the robotic vehicle. Additionally or alternatively, the communication link is a direct link between the electronic device and the robotic mower. Additionally or alternatively, the communication link is an indirect link between the electronic device and the robotic mower, the indirect link including a wireless access point or the internet.

Figure 8:
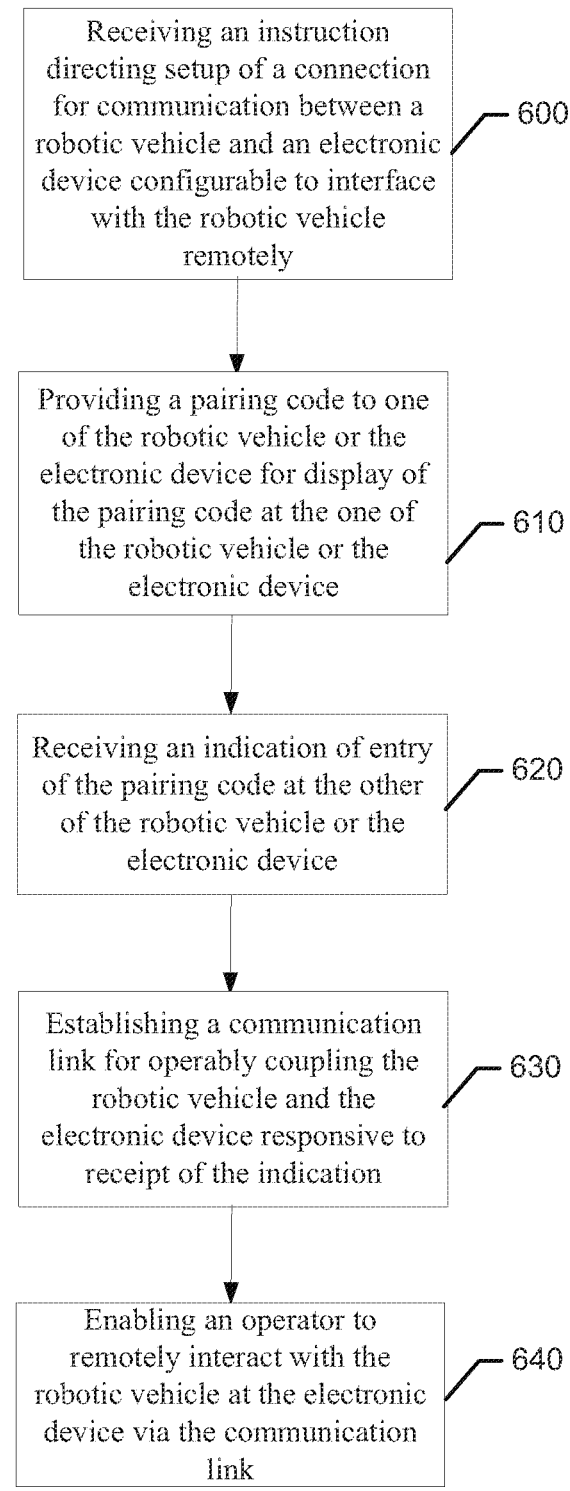
FIG. 8 illustrates a block diagram of a method for enabling control of the robotic mower according to an example embodiment.

In an example embodiment, an apparatus for performing the methods of FIGS. 7 and 8 above may comprise processing circuitry (e.g., processing circuitry 360) that may include a processor (e.g., an instance of the processor 362 at the server 120) configured to perform some or each of the operations (600-640) described above. The processing circuitry 360 may, for example, be configured to perform the operations (600-640) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (600-640) may comprise, for example, the processing circuitry 360.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method comprising:
   receiving, at an account manager, a plurality of instructions, each instruction of the plurality of instructions indicative of initiating pairing, directing setup of a connection for communication between a robotic mower and one of a plurality of electronic devices configurable to interface with the robotic mower remotely, wherein the instruction comprises a pairing code request, and wherein each of the plurality of electronic devices is associated with a respective different operator;
   providing, by the account manager, a pairing code to one of the robotic mower or each of the plurality of electronic devices for display of the pairing code at the one of the robotic mower or each of the plurality of electronic devices;
   receiving, at the account manager, an indication of entry of the pairing code at the other of the robotic mower or each of the plurality of electronic devices;
   pairing the robotic mower with the plurality of electronic devices at the account manager, wherein pairing further comprises associating, by the account manager, the robotic mower to a parcel of land having defined boundaries for operation the robotic mower to mow grass on the parcel;
   establishing a communication link for operably coupling the robotic mower and each of the plurality of electronic devices responsive to receipt of the indication; and
   enabling each of the plurality of electronic devices and the respective operator to remotely interact with the robotic mower via the communication link, wherein remotely interacting with the robotic mower comprises receiving a position update of the robotic mower within the parcel via the communication link.

2. The method of claim 1, wherein establishing the communication link comprises employing an encryption key for messages exchanged over the communication link.

3. The method of claim 2, wherein employing the encryption key comprises employing a pre shared key (PSK) that is not transferred.

4. The method of claim 1, wherein providing the pairing code comprises providing the pairing code for display at the robotic mower and wherein the indication is received from each of the plurality of electronic devices.

5. The method of claim 1, wherein providing the pairing code comprises providing the pairing code for display at each of the plurality of electronic devices and wherein the indication is received from the robotic mower.

6. The method of claim 1, wherein the robotic mower is a first robotic mower and the receiving the instruction, providing the pairing code, receiving the indication, establishing the communication link, and enabling each of the plurality of electronic devices and the respective operator to remotely interact with the robotic mower are each repeated with respect to a second robotic mower.

7. The method of claim 6, wherein the communication link enables each of the plurality of electronic devices to remotely control the first and second robotic mowers.

8. The method of claim 1, wherein the communication link enables each of the plurality of electronic devices to remotely control the robotic mower in real-time.

9. The method of claim 1, wherein the communication link enables each of the plurality of electronic devices to define one or more operational programs for guiding future operation of the robotic mower.

10. The method of claim 1, wherein the communication link is a direct link between each of the plurality of electronic devices and the robotic mower.

11. The method of claim 1, wherein the communication link is an indirect link between each of the plurality of electronic devices and the robotic mower, the indirect link including a wireless access point or the internet.

12. The method of claim 1, further comprising receiving via a user interface of the robotic mower a selection for adding the robotic mower to an account, and, in response to receiving the selection, transmit an identity of the robotic mower in a request for a pairing code.

13. The method of claim 1, wherein remotely interacting with the robotic mower comprises receiving, via the communication link, an indication that a boundary wire has been detected by the robotic mower and information regarding operation of a blade control system.

14. The method of claim 1, wherein remotely interacting with the robotic mower comprises providing, via the communication link, a definition of the a mowing path for mowing coverage of the parcel.

15. A robotic mower comprising processing circuitry configuring the robotic mower to:
   provide a request, indicative of initiating pairing, for a pairing code to an account manager responsive to user input;
   receive the pairing code from the account manager and display the pairing code at a display of the robotic mower;

receive a plurality of instructions, each instruction of the plurality of instructions establishing a communication link with one of a plurality of electronic devices paired with the robotic mower based on submission of the pairing code by each of the electronic devices to the account manager, wherein the pairing code is entered at each of the electronic devices prior to submission, wherein pairing the robotic mower with the plurality of electronic devices includes associating the robotic mower to a parcel of land having defined boundaries for operation the robotic mower to mow grass on the parcel;

receive subsequent instructions directing operation of the robotic mower from the plurality of electronic devices via the communication link, wherein each of the plurality of electronic devices is associated with a respective different operator; and provide a position update for the robotic mower within the parcel to the plurality of electronic devices via the communication link.

16. The robotic mower of claim 15, wherein establishing the communication link comprises employing an encryption key for messages exchanged over the communication link.

17. The robotic mower of claim 16, wherein employing the encryption key comprises employing a pre shared key (PSK) that is not transferred.

18. The robotic mower of claim 15, wherein the robotic mower is one of a plurality of robotic vehicles controllable remotely by each of the electronic devices.

19. The robotic mower of claim 15, wherein the communication link enables each of the electronic devices to remotely control the robotic mower in real-time.

20. The robotic mower of claim 15, wherein the communication link enables each of the electronic devices to define one or more operational programs for guiding future operation of the robotic mower.

* * * * *